United States Patent
Pfaendner et al.

(10) Patent No.: US 6,844,405 B2
(45) Date of Patent: Jan. 18, 2005

(54) (CO)POLYMERIZATION OF VINYL CHLORIDE IN THE PRESENCE OF A STABLE NITROXYL RADICAL

(75) Inventors: Rudolf Pfaendner, Rimbach (DE); Thomas Wannemacher, Darmstadt (DE); Dietrich Braun, Darmstadt (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 12 days.

(21) Appl. No.: 10/416,260

(22) PCT Filed: Nov. 6, 2001

(86) PCT No.: PCT/EP01/12820

§ 371 (c)(1),
(2), (4) Date: May 8, 2003

(87) PCT Pub. No.: WO02/38632

PCT Pub. Date: May 16, 2002

(65) Prior Publication Data

US 2004/0138393 A1 Jul. 15, 2004

(30) Foreign Application Priority Data

Nov. 13, 2000 (EP) .......................................... 00811066

(51) Int. Cl.[7] .................................................. C08F 4/00

(52) U.S. Cl. ...................... 526/217; 526/236; 526/220; 526/219.5; 526/266; 526/303.1; 526/346; 526/348.7; 526/335; 526/344; 526/344.1; 526/344.2

(58) Field of Search ................................ 526/217, 236, 526/220, 219.5, 266, 303.1, 346, 348.7, 335, 344, 344.1, 344.2

(56) References Cited

U.S. PATENT DOCUMENTS 5,880,230 A * 3/1999 Syrinek et al. ............... 526/83
6,353,107 B1 3/2002 Kramer et al. .............. 546/216

FOREIGN PATENT DOCUMENTS

WO 96/24620 8/1996

OTHER PUBLICATIONS

Derwent Abstr. 1987–014023 for SU 1235872 (1986).
Derwent Abstr. 1998–088850 for EP 821013 (1998).

* cited by examiner

Primary Examiner—William K. Cheung
(74) Attorney, Agent, or Firm—Tyler A. Stevenson

(57) ABSTRACT

The present invention pertains to a process for controlled free radical polymerization or copolymerization of vinyl chloride at a temperature between 40° C. and 95° C., at a pressure between 5 and 30 bar in the presence of a stable free nitroxyl radical.

18 Claims, No Drawings

(CO)POLYMERIZATION OF VINYL CHLORIDE IN THE PRESENCE OF A STABLE NITROXYL RADICAL

The present invention relates to the polymerization or copolymerization of vinyl chloride in the presence of a stable free nitroxyl radical. Further subjects of the invention are the use of stable free nitroxyl radicals as polymerization regulators for free radical polymerization of vinyl chloride and a polyvinyl chloride macroinitiator having a thermally labile bound nitroxyl group, capable to be split upon thermal treatment into a nitroxyl radical and a polymeric/oligomeric radical.

Polyvinyl chloride (PVC) holds a unique position amongst all the polymers produced. It is rather inexpensive and is used in such a wide range of applications that its versatility is almost unlimited. Depending on its molecular weight, additives and stabilizers, the applications range from rigid pipes and profiles to very soft, transparent and flexible films.

PVC can be produced from vinyl chloride monomer (VCM) by three different processes. The most widely used is the suspension type polymerization, which accounts for approximately 75%. Droplets of liquid vinyl chloride are dispersed in water using a protective colloid in an agitated reactor. Polymerization occurs inside the droplets as a result of the use of an oil-soluble initiator. The product is in the form of 100–150 µm diameter porous grains. Another process is the emulsion route, in which the monomer is dispersed in water, using agitation and powerful surfactants and the polymerization is carried out in the aqueous phase, using a water soluble initiator. The polymerization product is in the form of an aqueous latex dispersion of PVC particles 0.1–2.0 µm in diameter. These are spray-dried to form larger agglomerates, which are milled before being dispersed in solvents and plasticizers to give plastisols, used in a variety of spreading and dipping applications. The third route is bulk or mass polymerization. As the name implies the polymerization is carried out in vinyl chloride (VCM) in the absence of water. A review of the manufacturing of PVC is for example described in Encyclopedia of Polymer Science and Engineering, second edition, vol. 17, pages 295–376.

Controlled radical polymerization of ethylenically unsaturated monomers in the presence of a nitroxyl radical is principally known and for example described in U.S. Pat. No. 5,322,912 to Georges et al. issued Jun. 21, 1994. U.S. Pat. No. 5,322,912 discloses a polymerization process using a free radical initiator, a polymerizable monomer compound and a stable free radical agent of the basic structure R'R"N—O. for the synthesis of homopolymers and block copolymers of for example styrene. So far there is no process described in the prior art for the polymerization or copolymerization of vinyl chloride in the presence of nitroxyl radicals.

Since the polymerization of PVC is essentially based on the transfer reaction of chlorine radicals one would expect, that nitroxyl radicals lead to a reduction of the molecular weight, because they are theoretically capable of reacting with the chlorine radicals. In particular since nitroxyl radicals have been suggested as short stopping agents for use in the polymerization of vinyl monomers such as styrene.

It has now been found that the polymerization of vinyl chloride is not adversely affected by stable free nitroxyl radicals. On the contrary in the presence of a stable free nitroxyl radical, molecular weights remain high at relatively high polymerization temperatures, thereby allowing the production of high molecular weight polymers at high polymerization temperatures. This is in contrast to classical PVC polymerization, where increasing temperature results in lower molecular weight. On the other hand polydispersity (PD) of the PVC decreases, indicating a control of the polymerization reaction by the nitroxyl radicals. A lower polydispersity is desirable since the polymer contains less low molecular weight portions, which can be advantageous, for example, for the mechanical properties of the polymer. Nitroxyl radicals are attached to the PVC backbone thereby allowing a subsequent further radical polymerization starting from the PVC backbone by splitting into a macroradical and a nitroxyl radical upon thermal treatment. This is also called reinitiation. The PVC backbone can be seen as a macroinitiator onto which a second block can be polymerized. This opens totally new opportunities for the production of block copolymers with PVC as one block.

One subject of the invention is a process for controlled free radical polymerization or copolymerization of vinyl chloride at a temperature between 40° C. and 95° C., at a pressure between 5 and 30 bar in the presence of a stable free nitroxyl radical.

Preferably the polymerization or copolymerization is carried out in suspension.

The suspension polymerization process is essentially a bulk polymerization process carried out in millions of small "reactors" (droplets). Liquid vinyl chloride under its autogeneous vapor pressure is dispersed in water by vigorous stirring in a reactor (autoclave). This results in the formation of droplets of for example an average size between 30–40 µm which are stabilized against coalescence by one or more protective colloids (granulating agents). The other essential ingredient is a monomer-soluble free radical initiator. Typically such a basic formulation, also called recipe, can contain 100 parts vinyl chloride, 90–130 parts water, 0.05–0.15 parts protective colloid and 0.03–0.08 parts radical initiator. To achieve the optimum morphology other additives have to be employed, such as oxygen, buffers, secondary or tertiary granulating agents, chain transfer or chain extending agents, comonomers and antioxidants.

Typical protective colloids are cellulose ether derivatives, partially hydrolyzed polyvinyl acetates or polyvinyl alcohols. Examples for cellulose ethers are hydroxypropylmethylcellulose, hydroxyethyl-cellulose, hydroxypropyl-cellulose or methyl-cellulose.

Typical radical initiators are diacyl peroxides such as dilauroyl peroxide, peroxodicarbonates, such as dicyclohexyl peroxodicarbonate or dicetyl peroxodicarbonate, alkyl peroxyesters, such as t-butylperoxypivalate or α-cumyl perneodecanoate and azo initiators, such as azobisisobutyronitrile. It is advantageous to select an initiator with a half life of 1–10 hours, preferably 2–5 hours at the polymerization temperature.

Although the stable free nitrogen radical may be added not only at the beginning of the reaction, but also in a later stage where polymerization has already proceeded to some extent, it is preferably added before 10% of polymer formation has occurred and more preferably added directly to the recipe at the beginning of the polymerization.

Preferred is a process, wherein the free radical initiator is present in an amount of from 0.001 mol % to 5 mol %, more preferred 0.005 to 1 mol %, based on the monomer.

Typically the amount of stable free nitroxyl radical is from 0.001 to 1 mol 5 based on the monomer.

Preferably the molar ratio of free radical initiator to stable free nitroxyl radical is from 100:1 to 1:10, more preferably from 10:1 to 1:2.

It is also possible to add to the initial recipe a nitroxylether R'R"N—O—X, where X represents a group having at least one carbon atom and is such that a free radical X. derived from X is formed under the reaction conditions applied. The formation of an additional free radical X. may in the case of vinyl chloride enhance the radical polymerization initiated by the free radical initiator, whereas its counterpart, the nitroxyl radical, can act as controlling agent. Nitroxylethers of the generic formula R'R"N—O—X and their use as initiating and polymerization controlling agents have first been described in U.S. Pat. No. 4,581,429 by Solomon.

Hence a process, wherein the stable free nitroxyl radical is formed in situ during the polymerization reaction from the corresponding nitroxylether is also a preferred embodiment of the present invention.

Preferably the polydispersity of the polyvinyl chloride is from 1.1 to 2.5, more preferably from 1.1 to 2.0.

Many attempts have been made in the last years to find new versatile stable free nitroxyl radicals or nitroxyl ethers which improve for example conversion rate however retaining the advantages of controlled polymerization as for example low polydispersity and the capability of block copolymer formation. Many improvements have been made by modifying the chemical structure of the nitroxyl radical or of the nitroxyl ether. All these prior art compounds are principally suitable for controlled polymerization of vinyl chloride.

WO 98/13392 for example describes open chain alkoxyamine compounds which have a symmetrical substitution pattern and are derived from nitroso compounds.

WO 96/24620 describes a polymerization process in which very specific stable free radical agents are used, such as for example

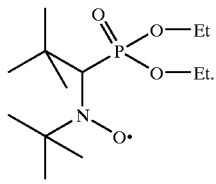

WO 98/30601 discloses specific nitroxyls based on imidazolidinons.

WO 98/44008 discloses specific nitroxyls based on morpholinones, piperazinones and piperazindiones.

Further suitable nitroxylethers and nitroxyl radicals are principally known from U.S. Pat. No. 4,581,429 or EP-A-621 878. Particularly useful are the open chain compounds described in WO 99/03894 and WO 00/07981, the piperidine derivatives described in WO 99/67298 and GB 2335190 or the heterocyclic compounds described in GB 2342649 and WO 96/24620.

Particularly useful are stable free nitroxyl radicals of formula A', B' or O',

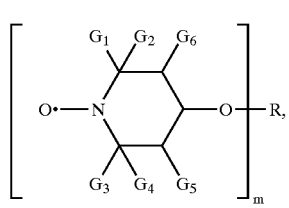

(A')

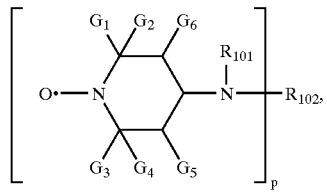

(B')

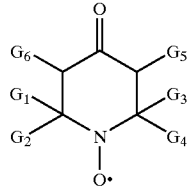

(O')

wherein
m is 1,
R is hydrogen, $C_1$–$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;
p is 1;
$R_{101}$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;
$R_{102}$ is $C_1$–$C_{18}$alkyl, $C_5$–$C_7$cycloalkyl, $C_2$–$C_8$alkenyl unsubstituted or substituted by a cyano, carbonyl or carbamide group, or is glycidyl, a group of the formula —$CH_2CH(OH)$—Z or of the formula —CO-Z or —CONH-Z wherein Z is hydrogen, methyl or phenyl;
$G_6$ is hydrogen and $G_5$ is hydrogen or $C_1$–$C_4$alkyl, and
$G_1$ and $G_3$ are methyl and $G_2$ and $G_4$ are ethyl or propyl or $G_1$ and $G_2$ are methyl and $G_3$ and $G_4$ are ethyl or propyl.

Preferably in formula A', B' and O' R is hydrogen, $C_1$–$C_{18}$alkyl, cyanoethyl, benzoyl, glycidyl, a monovalent radical of an aliphatic, carboxylic acid;
$R_1$ is $C_1$–$C_{12}$alkyl, $C_7$–$C_8$aralkyl, $C_2$–$C_{18}$alkanoyl, $C_3$–$C_5$alkenoyl or benzoyl;
$R_2$ is $C_1$–$C_{18}$alkyl, glycidyl, a group of the formula —$CH_2CH(OH)$-Z or of the formula —CO-Z,
wherein Z is hydrogen, methyl or phenyl.

The above compounds and their preparation is described in GB 2335190.

Another preferred group of nitroxyl radicals are those of formula (Ic'), (Id'), (Ie'), (If'), (Ig') or (Ih')

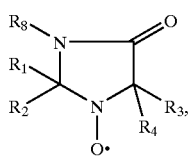

(Ic')

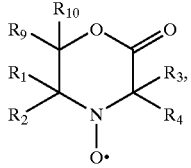

(Id')

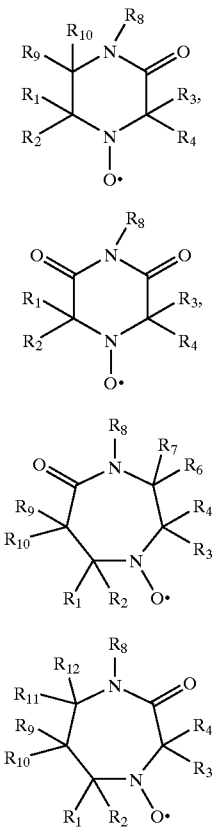

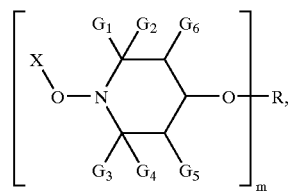

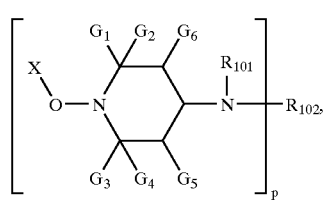

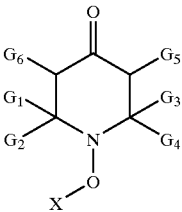

wherein R₁, R₂, R₃ and R₄ independently of each other are $C_1$–$C_{18}$alkyl, $C_3$–$C_{18}$alkenyl, $C_3$–$C_{18}$alkinyl, $C_1$–$C_{18}$alkyl, $C_3$–$C_{18}$alkenyl, $C_3$–$C_{18}$alkinyl which are substituted by OH, halogen or a group —O—C(O)—R₅, $C_2$–$C_{18}$alkyl which is interrupted by at least one O atom and/or NR₅ group, $C_3$–$C_{12}$cycloalkyl or $C_6$–$C_{10}$aryl or R₁ and R₂ and/or R₃ and R₄ together with the linking carbon atom form a $C_3$–$C_{12}$cycloalkyl radical;

R₅, R₆ and R₇ independently are hydrogen, $C_1$–$C_{18}$alkyl or $C_6$–$C_{10}$aryl;

R₈ is hydrogen, OH, $C_1$–$C_{18}$alkyl, $C_3$–$C_{18}$alkenyl, $C_3$–$C_{18}$alkinyl, $C_1$–$C_{18}$alkyl, $C_3$–$C_{18}$alkenyl, $C_3$–$C_{18}$alkinyl which are substituted by one or more OH, halogen or a group —O—C(O)—R₅, $C_2$–$C_{18}$alkyl which is interrupted by at least one O atom and/or NR₅ group, $C_3$–$C_{12}$cycloalkyl or $C_6$–$C_{10}$aryl, $C_7$–$C_9$phenylalkyl, $C_5$–$C_{10}$heteroaryl, —C(O)—$C_1$–$C_{18}$alkyl, —O—$C_1$–$C_{18}$alkyl or —COO$C_1$–$C_{18}$alkyl; and R₉, R₁₀, R₁₁, and R₁₂ are independently hydrogen, phenyl or $C_1$–$C_{18}$alkyl.

Preferably in formula (Ic'), (Id'), (Ie'), (If'), (Ig') and (Ih') at least two of R₁, R₂, R₃ and R₄ are ethyl, propyl or butyl and the remaining are methyl; or R₁ and R₂ or R₃ and R₄ together with the linking carbon atom form a $C_5$–$C_6$cycloalkyl radical and one of the remaining substituents is ethyl, propyl or butyl.

The above compounds and their preparation is described in GB 2342649.

Yet another preferred group of compounds are those wherein the stable free nitroxyl radical has a hydrogen atom bound to the carbon atom in α-position to the nitrogen atom. Examples and their preparation are given in WO 00/53640.

When nitroxyl ethers are used, those are preferred which lead after cleavage to the above mentioned nitroxyl radicals.

Particularly preferred are the nitroxyl ether of formula A, B or O, wherein m is 1, R is hydrogen, $C_1$–$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_{101}$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;

$R_{102}$ is $C_1$–$C_{18}$alkyl, $C_5$–$C_7$cycloalkyl, $C_2$–$C_8$alkenyl unsubstituted or substituted by a cyano, carbonyl or carbamide group, or is glycidyl, a group of the formula —CH₂CH(OH)-Z or of the formula —CO-Z or —CONH-Z wherein Z is hydrogen, methyl or phenyl;

G₆ is hydrogen and G₅ is hydrogen or $C_1$–$C_4$alkyl,

G₁ and G₃ are methyl and G₂ and G₄ are ethyl or propyl or G₁ and G₂ are methyl and G₃ and G₄ are ethyl or propyl; and X is selected from the group consisting of
—CH₂-phenyl, CH₃CH-phenyl, (CH₃)₂C-phenyl, ($C_5$–$C_8$cycloalkyl)₂CCN, (CH₃)₂CCN, —CH₂CH═CH₂, CH₃CH—CH═CH₂ ($C_1$–$C_4$alkyl)CR₂₀—C(O)-phenyl, ($C_1$–$C_4$)alkyl-CR₂₀—C(O)—($C_1$–$C_4$)alkoxy, ($C_1$–$C_4$)alkyl-CR₂₀—C(O)—($C_1$–$C_4$)alkyl, ($C_1$–$C_4$)alkyl-CR₂₀—C(O)—N-di($C_1$–$C_4$)alkyl, ($C_1$–$C_4$)alkyl-CR₂₀—C(O)—NH($C_1$–$C_4$)alkyl, ($C_1$–$C_4$)alkyl-CR₂₀—C(O)—NH₂, wherein R₂₀ is hydrogen or ($C_1$–$C_4$)alkyl.

More preferred are compounds, wherein in formula A, B and O

R is hydrogen, $C_1$–$C_{18}$alkyl, cyanoethyl, benzoyl, glycidyl, a monovalent radical of an aliphatic, carboxylic acid;

$R_{101}$ is $C_1$–$C_{12}$alkyl, $C_7$–$C_8$aralkyl, $C_2$–$C_{18}$alkanoyl, $C_3$–$C_5$alkenoyl or benzoyl;

$R_{102}$ is $C_1$–$C_{18}$alkyl, glycidyl, a group of the formula —CH₂CH(OH)-Z or of the formula —CO-Z wherein Z is hydrogen, methyl or phenyl; and X is CH$_3$CH-phenyl.

These compounds and their preparation is described in GB 2335190.

Equally preferred is a process wherein the nitroxyl ether from which the stable free nitroxyl radical is formed is of formula (Ic), (Id), (Ie), (If), (Ig) or (Ih)

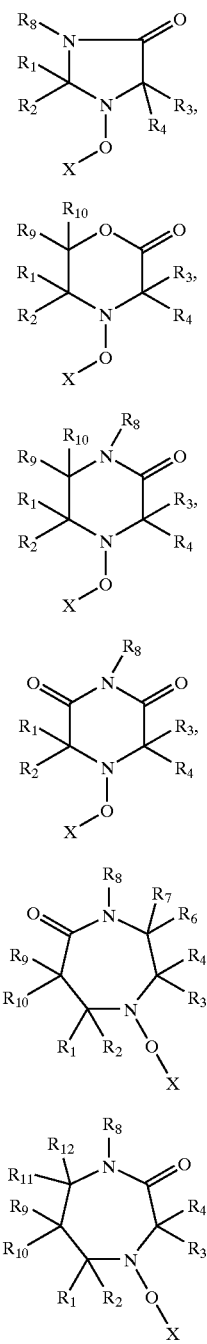

wherein R$_1$, R$_2$, R$_3$ and R$_4$ independently of each other are C$_1$–C$_{18}$alkyl, C$_3$–C$_{18}$alkenyl, C$_3$–C$_{18}$alkinyl, C$_1$–C$_{18}$alkyl, C$_3$–C$_{18}$alkenyl, C$_3$–C$_{18}$alkinyl which are substituted by OH, halogen or a group —O—C(O)—R$_5$, C$_2$–C$_{18}$alkyl which is interrupted by at least one O atom and/or NR$_5$ group, C$_3$–C$_{12}$cycloalkyl or C$_6$–C$_{10}$aryl or R$_1$ and R$_2$ and/or R$_3$ and R$_4$ together with the linking carbon atom form a C$_3$–C$_{12}$cycloalkyl radical;

R$_5$, R$_6$ and R$_7$ independently are hydrogen, C$_1$–C$_{18}$alkyl or C$_6$–C$_{10}$aryl;

R$_8$ is hydrogen, OH, C$_1$–C$_{18}$alkyl, C$_3$–C$_{18}$alkenyl, C$_3$–C$_{18}$alkinyl, C$_1$–C$_{18}$alkyl, C$_3$–C$_{18}$alkenyl, C$_3$–C$_{18}$alkinyl which are substituted by one or more OH, halogen or a group —O—C(O)—R$_5$, C$_2$–C$_{18}$alkyl which is interrupted by at least one O atom and/or NR$_5$ group, C$_3$–C$_{12}$cycloalkyl or C$_6$–C$_{10}$aryl, C$_7$–C$_9$phenylalkyl, C$_5$–C$_{10}$heteroaryl, —C(O)—C$_1$–C$_{18}$alkyl, —O—C$_1$–C$_{18}$alkyl or —COOC$_1$–C$_{18}$alkyl;

R$_9$, R$_{10}$, R$_{11}$ and R$_{12}$ are independently hydrogen, phenyl or C$_1$–C$_{18}$alkyl; and X is selected from the group consisting of —CH$_2$-phenyl; CH$_3$CH-phenyl, (CH$_3$)$_2$C-phenyl, (C$_5$–C$_6$cycloalkyl)$_2$CCN, (CH$_3$)$_2$CCN, —CH$_2$CH=CH$_2$, CH$_3$CH—CH=CH$_2$ (C$_1$–C$_4$alkyl)CR$_{20}$—C(O)phenyl, (C$_1$–C$_4$)alkyl-CR$_{20}$—C(O)—(C$_1$–C$_4$)alkoxy, (C$_1$–C$_4$)alkyl-CR$_{20}$—C(O)—(C$_1$–C$_4$)alkyl, (C$_1$–C$_4$)alkyl-CR$_{20}$—C(O)—N-di(C$_1$–C$_4$)alkyl, (C$_1$–C$_4$)alkyl-CR$_{20}$—C(O)—NH(C$_1$–C$_4$)alkyl, (C$_1$–C$_4$)alkyl-CR$_{20}$—C(O)—NH$_2$, wherein R$_{20}$ is hydrogen or (C$_1$–C$_4$)alkyl.

Most preferred are compounds wherein in formula (Ic), (Id), (Ie), (If), (Ig) and (Ih) at least two of R$_1$, R$_2$, R$_3$ and R$_4$ are ethyl, propyl or butyl and the remaining are methyl; or R$_1$ and R$_2$ or R$_3$ and R$_4$ together with the linking carbon atom form a C$_5$–C$_6$cycloalkyl radical and one of the remaining substituents is ethyl, propyl or butyl.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 3 to 18 carbon atoms is a linear or branched radical as for example propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl oder n-4-octadecenyl. Preferred is alkenyl with 3 bis 12, particularly preferred with 3 to 6 carbon atoms.

Alkinyl with 3 to 18 is a linear or branched radical as for example propinyl (—CH$_2$—C≡CH), 2-butinyl, 3-butinyl, n-2-octinyl, oder n-2-octadecinyl. Preferred is alkinyl with 3 to 12, particularly preferred with 3 to 6 carbon atoms.

Examples for hydroxy substituted alkyl are hydroxy propyl, hydroxy butyl or hydroxy hexyl.

Examples for halogen substituted alkyl are dichloropropyl, monobromobutyl or trichlorohexyl.

C$_2$–C$_{18}$alkyl interrupted by at least one O atom is for example —CH$_2$—CH$_2$—O—CH$_2$—CH$_3$, —CH$_2$—CH$_2$—O—CH$_3$— or —CH$_2$CH$_2$—CH$_2$—CH$_2$—CH$_2$O—CH$_2$—CH$_3$—. It is preferably derived from polyethylene glycol. A general description is —((CH$_2$)$_a$—O)$_b$—H/CH$_3$, wherein a is a number from 1 to 6 and b is a number from 2 to 10.

C$_2$–C$_{18}$alkyl interrupted by at least one NR$_5$ group may be generally described as —((CH$_2$)$_3$—NR$_5$)$_b$—H/CH$_3$, wherein a, b and R$_5$ are as defined above.

C$_3$–C$_{12}$cycloalkyl is typically, cyclopropyl, cyclopentyl, methylcyclopentyl, dimethylcyclopentyl, cyclohexyl, methylcyclohexyl or trimethylcyclohexyl.

C$_6$–C$_{10}$ aryl is for example phenyl or naphthyl, but also comprised are C$_1$–C$_4$alkyl substituted phenyl, C$_1$–C$_4$alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene.

Alkoxy substituents are typically methoxy, ethoxy, propoxy or butoxy and their corresponding isomers.

$C_7$–$C_9$phenylalkyl is benzyl, phenylethyl or phenylpropyl.

$C_5$–$C_{10}$heteroaryl is for example pyrrol, pyrazol, imidazol, 2, 4, dimethylpyrrol, 1-methylpyrrol, thiophene, furane, furfural, indol, cumarone, oxazol, thiazol, isoxazol, isothiazol, triazol, pyridine, α-picoline, pyridazine, pyrazine or pyrimidine.

If R is a monovalent radical of a carboxylic acid, it is, for example, an acetyl, propionyl, butyryl, valeroyl, caproyl, stearoyl, lauroyl, acryloyl, methacryloyl, benzoyl, cinnamoyl or β-(3,5-di-tert-butyl-4-hydroxyphenyl)propionyl radical.

$C_1$–$C_{18}$alkanoyl is for example, formyl, propionyl, butyryl, octanoyl, dodecanoyl but preferably acetyl and $C_3$–$C_5$alkenoyl is in particular acryloyl.

Particularly suitable nitroxylethers and nitroxyl radicals are those of formulae

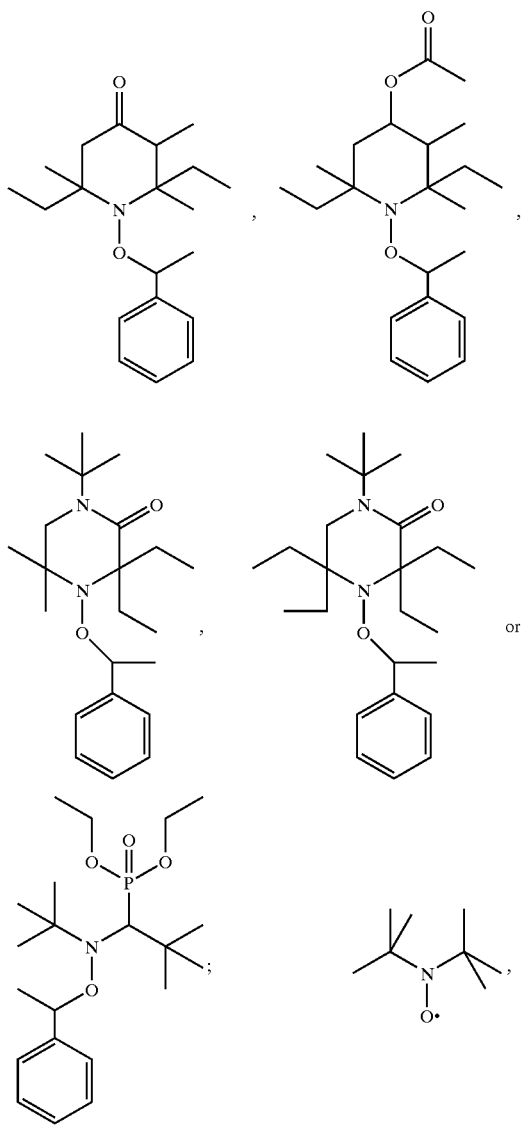

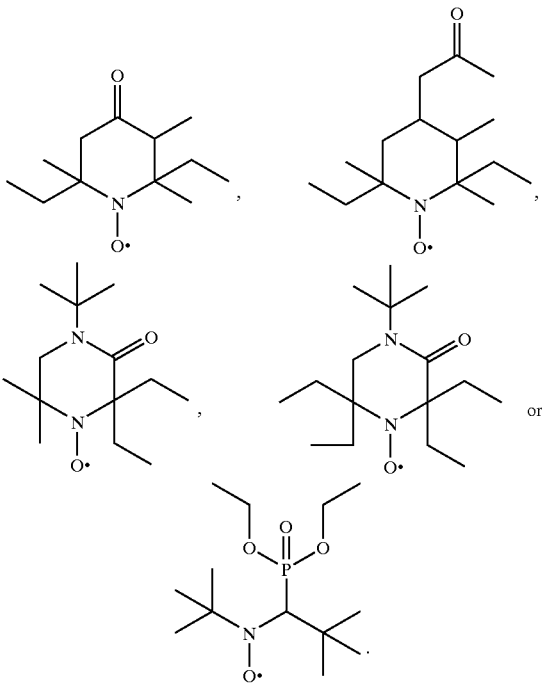

The process is particularly useful for the preparation of block copolymers, wherein in a first step vinyl chloride is polymerized and in a second step a different ethylenically unsaturated monomer is added to the polyvinyl chloride and block copolymerized to form an A-B block.

It is also possible to repeat the procedure two, three or more times and to arrive at multi-block structures.

When copolymers are made, they may be of statistical copolymer structure, tapered structure or multiblock copolymer structure such as A-B-A, B-A-B or A-B-C. The length of the blocks may vary in a wide range. It may be sufficient to influence the polymer properties, such as polyrity, compatibility or adhesion if the second block consists for example of one to a few monomer units. For the modification of other properties, such as glass transition temperatures or mechanical properties a block length of more than 5 units is preferable.

Preferably the different ethylenically unsaturated monomer is selected from the group consisting of ethylene, propylene, n-butylene, i-butylene, styrene, substituted styrene, vinylpyridine, conjugated dienes, acrolein, vinyl acetate, vinylpyrrolidone, vinylimidazole, maleic anhydride, maleinimide which may be unsubstituted at the nitrogen atom or substituted by alkyl or aryl, (alkyl)acrylic acidanhydrides, (alkyl)acrylic acid salts, (alkyl)acrylicacid esters, (alkyl)acrylonitriles or (alkyl)acrylamides.

For example the ethylenically unsaturated monomer is a compound of formula $CH_2=C(R_a)-(C=Z)-R_b$, wherein $R_a$ is hydrogen or $C_1$–$C_4$alkyl, $R_b$ is $NH_2$, $O^-(Me^+)$, glycidyl, unsubstituted $C_1$–$C_{18}$alkoxy, $C_2$–$C_{100}$alkoxy interrupted by at least one N and/or O atom, or hydroxy-substituted $C_1$–$C_{18}$alkoxy, unsubstituted $C_1$–$C_{16}$alkylamino, di($C_1$–$C_{18}$alkyl)amino, hydroxy-substituted $C_1$–$C_{18}$alkylamino or hydroxy-substituted di($C_1$–$C_{18}$alkyl) amino, $-O-CH_2CH_2-N(CH_3)_2$ or $-O-CH_2-CH_2-N^+H(CH_3)_2$ $An^-$;

An⁻ is a anion of a monovalent organic or inorganic acid;
Me is a monovalent metal atom or the ammonium ion.
Z is oxygen or sulfur.

Examples of acids from which the anion An⁻ is derived are $C_1$–$C_{12}$carboxylic acids, organic sulfonic acids such as $CF_3SO_3H$ or $CH_3SO_3H$, mineralic acids such as HCl, HBr or HI, oxo acids such as $HClO_4$ or complex acids such as $HPF_6$ or $HBF_4$.

Examples for $R_b$ as $C_2$–$C_{100}$alkoxy interrupted by at least one O atom are of formula

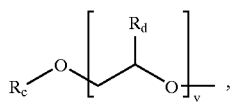

wherein $R_c$ is $C_1$–$C_{25}$alkyl, phenyl or phenyl substituted by $C_1$–$C_{18}$alkyl, $R_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

Further examples of suitable acrylate or methacrylate monomers are given below.

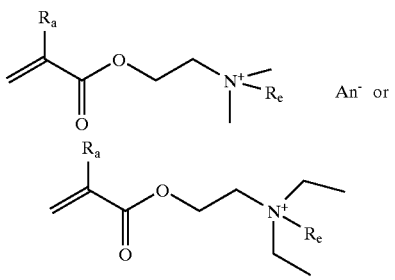

An⁻, wherein An⁻ and $R_a$ have the meaning as defined above and $R_e$ is methyl or benzyl. An⁻ is preferably Cl⁻, Br⁻ or ⁻$O_3S$—$CH_3$.

Further acrylate monomers are

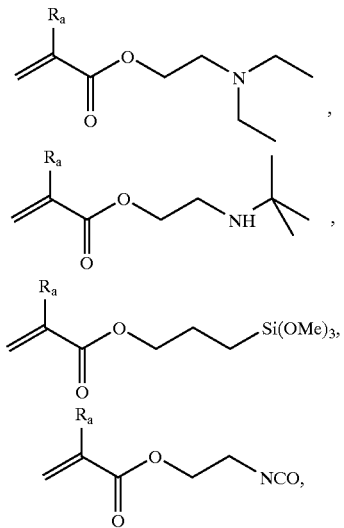

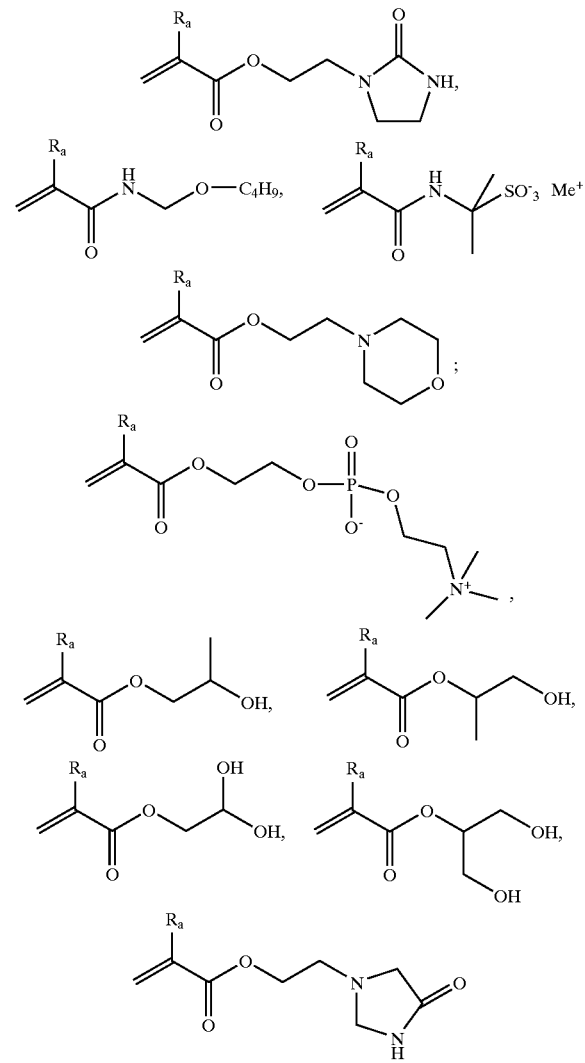

Examples for suitable monomers other than acrylates are

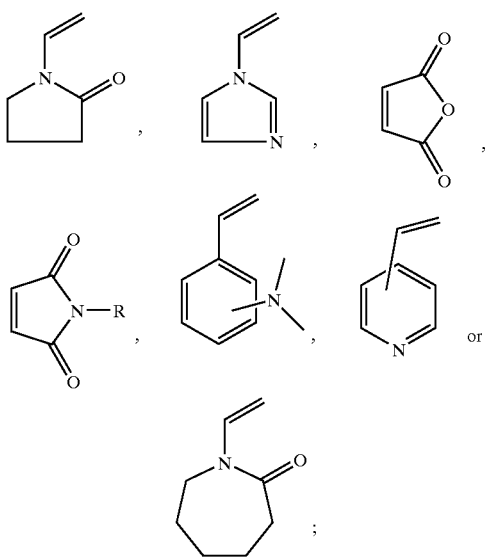

wherein R is H, $C_1$–$C_{12}$alkyl or phenyl.

Preferably $R_a$ is hydrogen or methyl, $R_b$ is $NH_2$, gycidyl, unsubstituted or with hydroxy substituted $C_1$–$C_4$alkoxy, unsubstituted $C_1$–$C_4$alkylamino, di($C_1$–$C_4$alkyl)amino, hydroxy-substituted $C_1$–$C_4$alkylamino or hydroxy-substituted di($C_1$–$C_4$alkyl)amino; and Z is oxygen.

Most preferably the ethylenically unsaturated monomer is an acrylic acid ester, acrylamide, acryinitrile, methacrylic acid ester, methacrylamide, methacryinitrile, butadiene, isoprene or maleinimide.

The block copolymer can be prepared by first isolating the polyvinyl chloride and subsequent purification if necessary. The polyvinyl chloride is then dissolved or dispersed in a suitable solvent or in the monomer in a reactor. If not yet present, the monomer is added and the mixture is stirred under heating. Depending on the nitroxyl radical and the monomer used, a temperature from 90° C. to 160° C. may be necessary to initiate polymerization of the second block. Preferably the temperature is from 90° C. to 150° C. Other polymerization processes, such as emulsion, suspension or microemulsion are also possible.

It may be useful to carry out the second polymerization step in the presence of a PVC stabilizer to avoid thermal degradation of PVC, especially at higher reaction temperatures. Such stabilizers are for example Ca, Zn, Ba or Cd salts of carbonic acids. Preferred PVC stabilizers do not interfere with the radical polymerization process. Suitable stabilizers are for example mixed metal stabilizers, for example on the basis of Ca and Zn. Suitable stabilizers are described in "Plastic Additives Handbook, 5$^{th}$ Edition, 2000, pages 427–465".

In many cases isolation and purification of the polyvinyl chloride is not necessary and the second monomer can be added directly to the reactor wherein the vinyl chloride has been polymerized after excess vinyl chloride has been removed.

The possibility of reinitiating polymerization is a unique feature of a so called "living" polymerization.

Consequently a further subject of the invention is a polyvinyl chloride macroinitiator having bound a thermally labile nitroxyl group via the oxygen atom, said macroinitiator being able to split into a polyvinyl chloride radical and a nitroxyl radical upon thermal treatment.

Still another subject of the invention is the use of a stable free nitroxyl radical for controlled free radical polymerization or copolymerization of vinyl chloride at a temperature between 40° C. and 95° C., at a pressure between 5 and 30 bar.

Light and heat stabilizers and, if desired, further additives may be added to the polyvinylchloride (PVC) prepared by the instant process. These may be mixed with the PVC using equipment known per se, such as calenders, mixers, compounders, extruders and the like.

The polyvinylchloride prepared in accordance with the present invention can be converted into the desired shape in a known manner. Methods of this type are, for example, grinding, calendering, extrusion, injection moulding, sintering or spinning, furthermore extrusion blow moulding or conversion by the plastisol process. It can also be converted into foams.

The polyvinylchloride prepared according to the invention is particularly suitable for semirigid and flexible formulations, in particular in the form of flexible formulations for wire sheaths and cable insulations, which is particularly preferred. In the form of semirigid formulations it is particularly suitable for decorative films, foams, agricultural sheeting, tubes, sealing profiles and office films.

In the form of rigid formulations it is particularly suitable for hollow articles (bottles), packaging films (thermoformed films), blown films, crash-pad films (automobiles), tubes, foams, heavy profiles (window frames), light-wall profiles, building profiles, sidings, fittings, office films and equipment housings (computers and domestic applicances).

Examples of the use of the polyvinylchloride as plastisols are artificial leather, floor coverings, textile coatings, wall coverings, coil coatings and automobile underseal. The following examples illustrate the invention.

GENERAL EXPERIMENTAL DESCRIPTION OF EXAMPLES 1 THROUGH 9 AND CONTROL EXPERIMENTS A THROUGH D

The polymerization is carried out according to the suspension process in batch operation. A double jacketed pressure reactor is operated at a temperature between 70° C. and 85° C. The reactor volume is 500 ml, stirrer velocity 1000 rpm, the pressure amounts to 12–18 bar depending on the temperature used for polymerization.

The following recipe is added into the reactor
250 ml $H_2O$ demineralized and degassed
62.5 g (1 mol) vinyl chloride 3.7, 99.97% stabilized (supplier: Messer Griesheim)
234 mg polyvinylalkohol 7200, degree of hydrolysis 98% (supplier Merck Schuchard)
30 mg citric acid
0.1 mol % based on vinyl chloride of 1,1-dimethyl-2-ethylhexaneperoxoat (Luperox® Elf Atochem)

Molecular weights are determined by gel permeation chromatography (GPC) using tetrahydrofurane as eluens, based on polystyrene standards (3 columns, Polymer Laboratories).

The stable free nitroxyl radicals added to the recipe are given in Tables 1–4.

TABLE 1

Influence of temperature on polymerization in the presence of nitroxyl 1

| No. | T (° C.) | yield (%) | Mn | Mw | PD (Mw/Mn) |
|---|---|---|---|---|---|
| control A | 75 | 89 | 31000 | 72000 | 2.3 |
| control B | 80 | 88 | 25000 | 58000 | 2.3 |
| control C | 85 | 71 | 18000 | 47000 | 2.7 |
| example 1 | 75 | 57 | 29000 | 64000 | 2.2 |
| example 2 | 80 | 63 | 29000 | 56000 | 1.9 |
| example 3 | 85 | 57 | 24000 | 50000 | 2.1 | nitroxyl 1 is di-tert.butyl nitroxide at 0.05 mol % based on vinyl chloride
reaction time: 21 h
control A, B, C without di-tert.butyl nitroxide

TABLE 2

Influence of nitroxyl concentration using nitroxyl 1

| No. | Nitroxyl concentration (mol %) | T (° C.) | yield (%) | Mn | Mw | PD (Mw/Mn) |
|---|---|---|---|---|---|---|
| control D | — | 80 | 76 | 19000 | 51000 | 2.7 |
| example 4 | 0.025 | 85 | 56 | 20000 | 45000 | 2.2 |
| example 5 | 0.030 | 85 | 65 | 20000 | 44000 | 2.2 |
| example 6 | 0.050 | 85 | 42 | 19000 | 42000 | 2.3 |
| example 7 | 0.075 | 85 | 38 | 17000 | 40000 | 2.3 | nitroxyl 1 is di-tert.butyl nitroxide, mol % based on vinyl chloride reaction time: 21 h

TABLE 3

Influence of nitroxyl type

| No. | Nitroxyl radical 0.05 mol % on vinyl chloride | T (° C.) | yield (%) | Mn | Mw | PD (Mw/Mn) |
|---|---|---|---|---|---|---|
| control B | — | 80 | 88 | 25000 | 58000 | 2.3 |
| example 8 | nitroxyl 2 | 80 | 64 | 22000 | 51000 | 2.3 |
| example 9 | nitroxyl 3 | 80 | 74 | 20000 | 46000 | 2.2 | stable free nitroxyl radicals:

nitroxyl 2 is 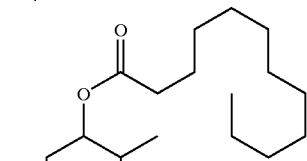 O, prepared according to WO 00/07981, nitroxyl 3 is 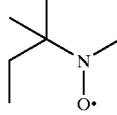 , prepared according to GB 2335190 reaction time: 21 h

GENERAL EXPERIMENTAL DESCRIPTION OF EXAMPLES 10 THROUGH 14 AND CONTROL EXPERIMENTS E, F

The polymerization is carried out according to the suspension process in batch operation. A double jacketed pressure reactor of a volume of 1000 ml is operated at a temperature between 70° C. and 90° C. at a stirrer velocity of 1000 rpm. The pressure amounts to 9–18 bar depending on the temperature used for the polymerization.

The following recipe is added into the reactor:

200 ml H$_2$O demineralized and degassed
75 g vinyl chloride 3.7, 99.97% stabilized (supplier Messer Griesheim),
300 mg polyvinylalcohol (mowiol 8–88, supplier Clariant)
0.1 mol-% based on vinyl chloride of 1,1-dimethyl-2-ethylhexaneperoxoat (Luperox 26, supplier. Atofina)

After a reaction time of 21 hours, the obtained polymer is isolated by filtration or centrifugation. The crude polymer is washed with water, filtered, washed with ethanol, dried under vacuum at 40° C. until constant weight.

Molecular weights and polydispersity are determined by GPC (3 columns, PL Polymer Laboratories), calibrated with narrow distributed polystyrene standards.

The results are given in Table 4.

TABLE 4

Influence of the temperature on polymerization in the presence of stable free nitroxyl radical 1:0.05 mol % based on vinyl chloride

| No. | T (° C.) | Yield (%) | Mn | Mw | PD (Mw/Mn) |
|---|---|---|---|---|---|
| control E | 70 | 94 | 1.8 | 5.1 | 2.6 |
| control F | 80 | 93 | 1.0 | 2.6 | 2.5 |
| example 10 | 70 | 35 | 2.0 | 4.1 | 2.0 |
| example 11 | 75 | 62 | n.d. | n.d. | n.d. |
| example 12 | 80 | 56 | 1.25 | 2.86 | 2.3 |
| example 13 | 85 | 43 | n.d. | n.d. | n.d. |
| example 14 | 90 | 43 | 1.6 | 3.5 | 2.2 | n.d. = not determined

EXPERIMENTAL DESCRIPTION OF THE REINITIATION EXAMPLES 15 THROUGH 22 AND CONTROL EXPERIMENT G

Reinitiation experiments are carried out in a 100 ml Schlenck-tube. The solution which contains the respective PVC, a monomer and solvent (chlorobenzene) is degassed and heated for 15 h (Table 5) or 21 h (Table 6) at the appropriate temperature indicated in table 5 and 6, while stirring. After cooling in an ice bath, the polymer is precipitated into 1500 ml methanol, filtered, washed with ethanol and dried under vacuum at 40° C. Molecular weights and polydispersity are determined by GPC (3 columns, PL Polymer Laboratories), calibrated with narrow distributed polystyrene standards.

The following recipe is used:
1.25 g PVC from example 7 and example 10
20 ml chlorobenzene
5 g comonomer as indicated in Tables 5 and 6, destabilized.

TABLE 5

Reinitiation and blockcopolymerization

| No. | starting material | second monomer | T (° C.) | yield (%) | Mn |
|---|---|---|---|---|---|
| example 15 | PVC from example 7 | styrene | 100 | 30 | 53000 |
| example 16 | PVC from example 7 | n-butyl-acrylate | 130 | 25 | 28000 | reaction time: 15 h

TABLE 6

Reinitiation and block copolymerization

| No. | Second monomer + optional additive | T (° C.) | Yield* (%) | Mn [× 10⁴] | Mw [× 10⁴] | PD |
|---|---|---|---|---|---|---|
| control G | PVC from example 10 | 130 | 91** | 2.0 | 3.6 | 1.8 |
| example 17 | butyl methacrylate | 130 | 41 | 2.4 | 6.0 | 2.5 |
| example 18 | styrene + acrylonitrile (1:3) | 110 | 15 | 2.4 | 7.2 | 3.0 |
| example 19 | styrene + MAA (1:1) + CSA 10 mg | 130 | 100 | Not determined | | |
| example 20 | styrene + MAI (1:1) + CSA 10 mg | 130 | 68 | 3.0 | 7.9 | 2.7 |
| example 21 | methyl methacrylate + Stab. 10 mg | 130 | 54 | 2.9 | 8.6 | 3.0 |
| example 22 | butyl acrylate + Stab. 10 mg | 120 | 22 | 1.9 | 3.9 | 2.0 |

*yield: conversion 2$^{nd}$ monomer
**recovery of PVC
CSA = campher-10-sulfonic acid,
MAA = maleic acid anhydride,
MAI = maleic acid imide,
Stab. = stearyl-benzoyl-methane.

Addition of CSA in the examples 19, 20 accelerates the polymerization rate as known e.g. from U.S. Pat. No. 5,608,023.

Addition of stearyl-benzoyl-methane to the reaction solution in example 21 and 22 results in reduced discoloration of the sample according to improved thermal stability of the PVC polymer.

EXAMPLE 23

In-Situ Reinitiation with Butadiene

A suspension of 30 g vinyl chloride, 200 ml H$_2$O demin, 300 mg poly vinyl alcohol (Mowiol 888) and 0.1 mol-% Initiator (1,1-dimethyl-2-ethylhexaneperoxoat) are stirred for 21 h reaction time at 90° C. with 1000 rpm. The reactor is degassed by a nitrogen stream and vacuum and filled with 30 g butadiene. The reaction is stirred at 90° C. for another 21 h. The product is isolated (7 g), purified and analyzed as described above. Mn=19.000, Mw=39.000, PD=2.0.

What is claimed is:

1. A process for controlled free radical polymerization or copolymerization of vinyl chloride,
which process comprises free radical polymerization or copolymerization of vinyl chloride at a temperature between 40° C. and 95° C., at a pressure between 5 and 30 bar in the presence of a stable free nitroxyl radical.

2. A process according to claim 1, wherein the polymerization or copolymerization is carried out in suspension.

3. A process according to claim 1, wherein the molar ratio of free radical initiator to stable free nitroxyl radical is from 100:1 to 1:10.

4. A process according to claim 1, wherein the stable free nitroxyl radical is present from the beginning of the polymerization.

5. A process according to claim 1, wherein the stable free nitroxyl radical is formed in situ during the polymerization reaction from the corresponding nitroxylether.

6. A process according to claim 1, wherein the stable free nitroxyl radical is a compound of formula A', B' or O',

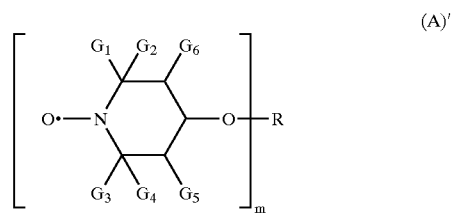

(A)'

-continued

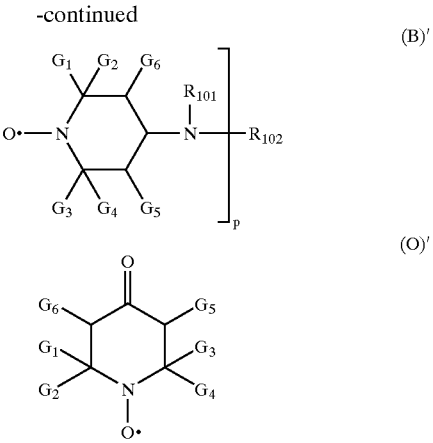

(B)'

(O)' wherein
m is 1,
R is hydrogen, $C_1$–$C_{18}$alkyl which is uninterrupted or interrupted by one or more oxygen atoms, cyanoethyl, benzoyl, glycidyl, or R is a monovalent radical of an aliphatic carboxylic acid having 2 to 18 carbon atoms, of a cycloaliphatic carboxylic acid having 7 to 15 carbon atoms or of an α,β-unsaturated carboxylic acid having 3 to 5 carbon atoms or of an aromatic carboxylic acid having 7 to 15 carbon atoms;
p is 1;
$R_{101}$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;

$R_{102}$ is $C_1$–$C_{18}$alkyl, $C_5$–$C_7$cycloalkyl, $C_2$–$C_8$alkenyl unsubstituted or substituted by a cyano, carbonyl or carbamide group, or is glycidyl, a group of the formula —$CH_2CH(OH)$-Z or of the formula —CO-Z or —CONH-Z wherein Z is hydrogen, methyl or phenyl;

$G_6$ is hydrogen and $G_5$ is hydrogen or $C_1$–$C_4$alkyl, and $G_1$ and $G_3$ are methyl and $G_2$ and $G_4$ are ethyl or propyl or $G_1$ and $G_2$ are methyl and $G_3$ and $G_4$ are ethyl or propyl.

7. A process according to claim 6, wherein in formula A', B' and O',

R is hydrogen, $C_1$–$C_{18}$alkyl, cyanoethyl, benzoyl, glycidyl or a monovalent radical of an aliphatic carboxylic acid;

$R_1$ is $C_1$–$C_{12}$alkyl, $C_7$–$C_8$aralkyl, $C_2$–$C_{18}$alkanoyl, $C_3$–$C_5$alkenoyl or benzoyl; and $R_2$ is $C_1$–$C_{18}$alkyl, glycidyl, a group of the formula —$CH_2CH(OH)$-Z or of the formula —CO-Z, wherein Z is hydrogen, methyl or phenyl.

8. A process according to claim 1, wherein the stable free nitroxyl radical is of formula (Ic'), (Id'), (Ie'), (If'), (Ig') or (Ih')

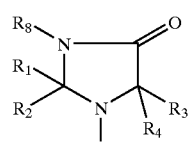
(Ic')

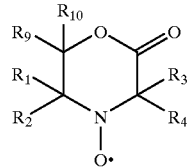
(Id')

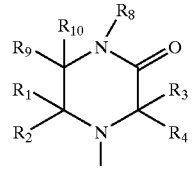
(Ie')

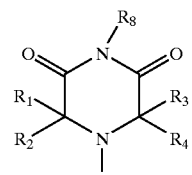
(If')

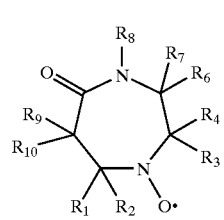
(Ig')

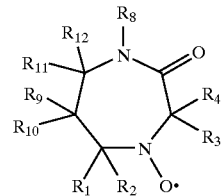
(Ih')

wherein $R_1$, $R_2$, $R_3$ and $R_4$ independently of each other are $C_1$–$C_{18}$alkyl, $C_3$–$C_{18}$alkenyl or $C_3$–$C_{18}$alkinyl, $C_1$–$C_{18}$alkyl, $C_3$–$C_{18}$alkenyl or $C_3$–$C_{18}$alkinyl which are substituted by OH, halogen or a group —O—C(O)—$R_5$, $C_2$–$C_{18}$alkyl which is interrupted by at least one O atom and/or $NR_5$ group, $C_3$–$C_{12}$cycloalkyl or $C_6$–$C_{10}$aryl or $R_1$ and $R_2$ and/or $R_3$ and $R_4$ together with the linking carbon atom form a $C_3$–$C_{12}$cycloalkyl radical;

$R_5$, $R_6$ and $R_7$ independently are hydrogen, $C_1$–$C_{18}$alkyl or $C_6$–$C_{10}$aryl;

$R_8$ is hydrogen, OH, $C_1$–$C_{18}$alkyl, $C_3$–$C_{18}$alkenyl or $C_3$–$C_{18}$alkinyl, $C_1$–$C_{18}$alkyl, $C_3$–$C_{18}$alkenyl or $C_3$–$C_{18}$alkinyl which are substituted by one or more OH, halogen or a group —O—C(O)—$R_5$, $C_2$–$C_{18}$alkyl which is interrupted by at least one O atom and/or $NR_5$ group, $C_3$–$C_{12}$cycloalkyl or $C_6$–$C_{10}$aryl, $C_7$–$C_9$phenylalkyl, $C_5$–$C_{10}$heteroaryl, —C(O)-$C_1$–$C_{18}$alkyl, —O—$C_1$–$C_{18}$alkyl or —$COOC_1$–$C_{18}$alkyl; and $R_9$, $R_{10}$, $R_{11}$ and $R_{12}$ are independently hydrogen, phenyl or $C_1$–$C_{18}$alkyl.

9. A process according to claim 8, wherein in formula (Ic'), (Id'), (Ie'), (If'), (Ig') and (Ih') at least two of $R_1$, $R_2$, $R_3$ and $R_4$ are ethyl, propyl or butyl and the remaining are methyl; or $R_1$ and $R_2$ or $R_3$ and $R_4$ together with the linking carbon atom form a $C_5$–$C_6$cycloalkyl radical and one of the remaining substituents is ethyl, propyl or butyl.

10. A process according to claim 1, wherein the stable free nitroxyl radical has a hydrogen atom bound to the carbon atom in α-position to the nitrogen atom.

11. A process according to claim 10, wherein the stable free nitrogen radical is a compound of formula

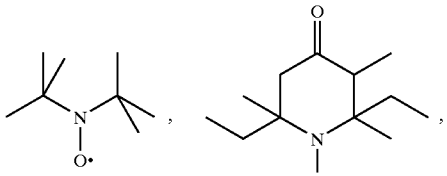

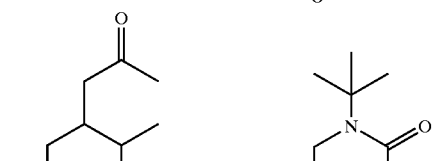

-continued

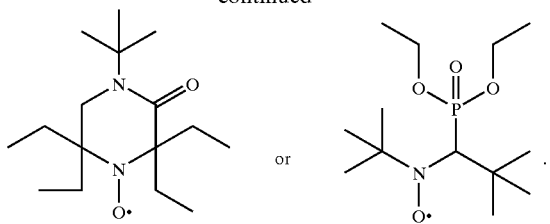

12. A process according to claim 5, wherein the nitroxyl-ether from which the stable free nitroxyl radical is formed is of formula A, B or O,

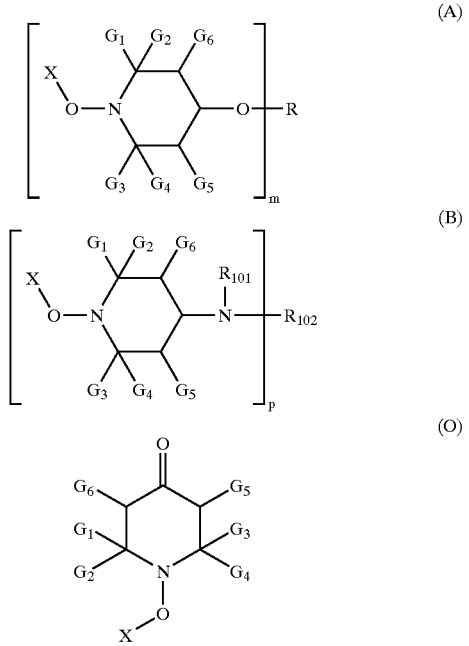

wherein m is 1,

R is hydrogen, $C_1$–$C_{18}$alkyl which is uninterrupted or interrupted by one or more oxygen atoms, cyanoethyl, benzoyl, glycidyl, or R is a monovalent radical of an aliphatic carboxylic acid having 2 to 18 carbon atoms, of a cycloaliphatic carboxylic acid having 7 to 15 carbon atoms or of an α,β-unsaturated carboxylic acid having 3 to 5 carbon atoms or of an aromatic carboxylic acid having 7 to 15 carbon atoms;

p is 1;

$R_{101}$ is $C_1$–$C_{12}$alkyl, $C_5$–$C_7$cycloalkyl, $C_7$–$C_8$aralkyl, $C_2$–$C_{18}$alkanoyl, $C_3$–$C_5$alkenoyl or benzoyl;

$R_{102}$ is $C_1$–$C_{18}$alkyl, $C_5$–$C_7$cycloalkyl, $C_2$–$C_8$alkenyl unsubstituted or substituted by a cyano, carbonyl or carbamide group, or is glycidyl or a group of the formula —$CH_2CH(OH)$-Z or of the formula —CO-Z or —CONH-Z wherein Z is hydrogen, methyl or phenyl;

$G_6$ is hydrogen and $G_5$ is hydrogen or $C_1$–$C_4$alkyl, $G_1$ and $G_3$ are methyl and $G_2$ and $G_4$ are ethyl or propyl or $G_1$ and $G_2$ are methyl and $G_3$ and $G_4$ are ethyl or propyl; and X is selected from the group consisting of —$CH_2$-phenyl, $CH_3CH$-phenyl, $(CH_3)_2C$-phenyl, $(C_5$–$C_5$cycloalkyl$)_2CCN$, $(CH_3)_2CCN$, $CH_2CH$=$CH_2$, $CH_3CH$—$CH$=$CH_2$ $(C_1$–$C_4$alkyl$)CR_{20}$—$C(O)$-phenyl, $(C_1$–$C_4)$alkyl-$CR_{20}$—$C(O)$—$(C_1$–$C_4)$alkoxy, $(C_1$–$C_4)$alkyl-$CR_{20}$—$C(O)$—$(C_1$–$C_4)$alkyl, $(C_1$–$C_4)$alkyl-$CR_{20}$—$C(O)$—N-di$(C_1$–$C_4)$alkyl, $(C_1$–$C_4)$alkyl-$CR_{20}$—$C(O)$—$NH(C_1$–$C_4)$alkyl, $(C_1$–$C_4)$alkyl-$CR_{20}$—$C(O)$—$NH_2$, wherein $R_{20}$ is hydrogen or $(C_0$–$C_4)$alkyl.

13. A process according to claim 12, wherein in formula A, B and O

R is hydrogen, $C_1$–$C_{18}$alkyl, cyanoethyl, benzoyl, glycidyl or a monovalent radical of an aliphatic carboxylic acid;

$R_{101}$ is $C_1$–$C_{12}$alkyl, $C_7$–$C_8$aralkyl, $C_2$–$C_{18}$alkanoyl, $C_3$–$C_5$alkenoyl or benzoyl;

$R_{102}$ is $C_1$–$C_{18}$alkyl, glycidyl or a group of the formula —$CH_2CH(OH)$-Z or of the formula —CO-Z, wherein Z is hydrogen, methyl or phenyl; and X is $CH_3CH$-phenyl.

14. A process according to claim 5, wherein the nitroxyl-ether from which the stable free nitroxyl radical is formed is of formula (Ic), (Id), (Ie), (If), (Ig) or (Ih)

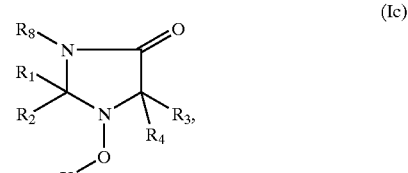 (Ic)

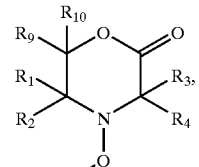 (Id)

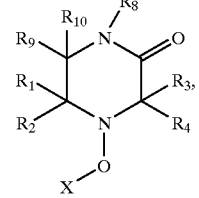 (Ie)

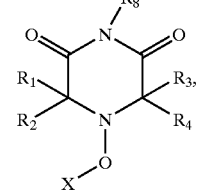 (If)

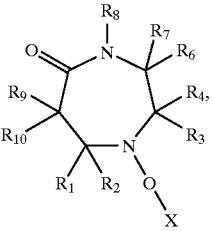 (Ig)

-continued

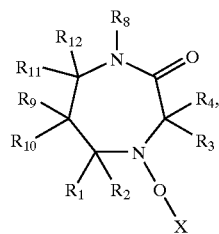

(Ih)

wherein $R_1$, $R_2$, $R_3$ and $R_4$ independently of each other are $C_1$–$C_{18}$alkyl, $C_3$–$C_{18}$alkenyl or $C_3$–$C_{18}$alkinyl, $C_1$–$C_{18}$alkyl, $C_3$–$C_{18}$alkenyl or $C_3$–$C_{18}$alkinyl which are substituted by OH, halogen or a group
—O—C(O)—$R_5$, $C_2$–$C_{18}$alkyl which is interrupted by at least one O atom and/or $NR_5$ group,
$C_3$–$C_{12}$cycloalkyl or $C_6$–$C_{10}$aryl or $R_1$ and $R_2$ and/or $R_3$ and $R_4$ together with the linking carbon atom form a $C_3$–$C_{12}$cycloalkyl radical;
$R_5$, $R_6$ and $R_7$ independently are hydrogen, $C_1$–$C_{18}$alkyl or $C_6$–$C_{10}$aryl;
$R_8$ is hydrogen, OH, $C_1$–$C_{18}$alkyl, $C_3$–$C_{18}$alkenyl or $C_3$–$C_{18}$alkinyl, $C_1$–$C_{18}$alkyl, $C_3$–$C_{18}$alkenyl or $C_3$–$C_{18}$alkinyl which are substituted by one or more OH, halogen or a group —O—C(O)—$R_5$, $C_2$–$C_{18}$alkyl which is interrupted by at least one O atom and/or $NR_5$ group, $C_3$–$C_{12}$cycloalkyl or $C_6$–$C_{10}$aryl, $C_7$–$C_9$phenylalkyl, $C_5$–$C_{10}$heteroaryl, —C(O)—$C_1$–$C_{18}$alkyl, —O—$C_1$–$C_{18}$alkyl or —COO$C_1$–$C_{18}$alkyl;
$R_9$, $R_{10}$, $R_{11}$, and $R_{12}$ are independently hydrogen, phenyl or $C_1$–$C_{18}$alkyl; and
X is selected from the group consisting of —$CH_2$-phenyl, $CH_3CH$-phenyl, $(CH_3)_2C$-phenyl, $(C_5$–$C_6$cycloalkyl$)_2$CCN, $(CH_3)_2$CCN, —$CH_2CH=CH_2$, $CH_3CH$—CH=$CH_2$ ($C_1$–$C_4$alkyl)$CR_{20}$—C(O)-phenyl, ($C_1$–$C_4$) alkyl-$CR_{20}$—C(O)—($C_1$–$C_4$)alkoxy, ($C_1$–$C_4$)alkyl-$CR_{20}$—C(O)—($C_1$–$C_4$)alkyl, ($C_1$–$C_4$)alkyl-$CR_{20}$—C(O)—N-di($C_1$–$C_4$)alkyl, ($C_1$–$C_4$)alkyl-$CR_{20}$—C(O)—NH($C_1$–$C_4$)alkyl and ($C_1$–$C_4$)alkyl-$CR_{20}$—C(O)—$NH_2$, wherein $R_{20}$ is hydrogen or ($C_1$–$C_4$)alkyl.

15. A process according to claim 14, wherein in formula (Ic), (Id), (Ie), (f), (Ig) and (Ih) at least two of $R_1$, $R_2$, $R_3$ and $R_4$ are ethyl, propyl or butyl and the remaining are methyl; or $R_1$ and $R_2$ or $R_3$ and $R_4$ together with the linking carbon atom form a $C_5$–$C_6$cycloalkyl radical and one of the remaining substituents is ethyl, propyl or butyl.

16. A process according to claim 1, wherein in a first step vinyl chloride is polymerized and in a second step a different ethylenically unsaturated monomer is added to the polyvinyl chloride and block copolymerized to form an A-B block.

17. A process according to claim 16, wherein the different ethylenically unsaturated monomer is selected from the group consisting of ethylene, propylene, n-butylene, i-butylene, styrene, substituted styrene, vinylpyridine, conjugated dienes, acrolein, vinyl acetate, vinylpyrrolidone, vinylimidazole, maleic anhydride, maleinimide which may be unsubstituted at the nitrogen atom or substituted by alkyl or aryl, (alkyl)acrylic acidanhydrides, (alkyl)acrylic acid salts, (alkyl)acrylicacid esters, (alkyl)acrylonitriles and (alkyl)acrylamides.

18. A polyvinyl chloride block copolymer prepared according to claim 16.

* * * * *